March 15, 1966  M. V. DE LANO, JR., ET AL  3,240,023
CONTROL SYSTEM FOR GAS SEPARATION PROCESS
Filed Oct. 12, 1962
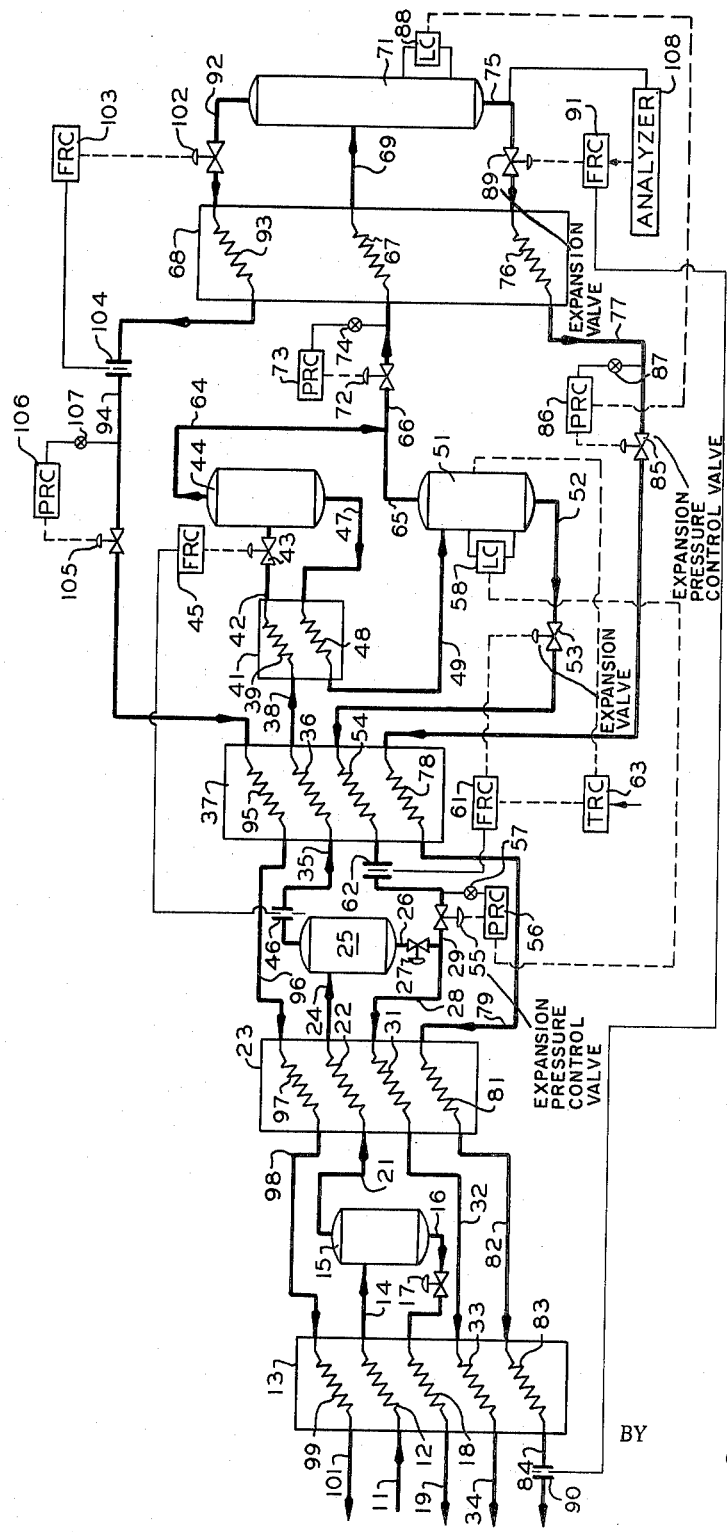
INVENTORS
M.V. DELANO, JR.
F.M. BRINKMEYER
BY
*Young & Quigg*
ATTORNEYS United States Patent Office 3,240,023
Patented Mar. 15, 1966

3,240,023
CONTROL SYSTEM FOR GAS
SEPARATION PROCESS
Merritt V. De Lano, Jr., and Francis M. Brinkmeyer, Bartlesville, Okla., assignors to Phillips Petroleum Company, a corporation of Delaware
Filed Oct. 12, 1962, Ser. No. 230,200
15 Claims. (Cl. 62—21)

This invention relates to method and apparatus for separating gases. In one aspect the invention relates to method and apparatus for the recovery of helium from a helium-containing gas. In a further aspect the invention relates to a control system for utilization in the recovery of helium from natural gas. In a still further aspect the invention relates to method and apparatus for controlling the separation of gases.

The value of helium as an inert atmosphere, a component of an artificial breathing medium, a lifting gas, and other diverse uses has been known. The world supply of naturally available helium is limited to very few geographical locations, most of which are within the continental United States, and is further limited so far as is presently known as being a minor constituent of natural gas. Various efforts have been made in the past to recover the helium from such a gas mixture economically, and have met with greater or lesser success.

In an autorefrigerated system for the separation of helium from a natural gas fed stream containing helium, the feed stream is cooled by the cool product streams being removed from the system. The feed stream is partially liquefied and flashed in a series of separation zones to obtain separation of the components and to obtain additional cooling. The temperature of each separation zone is determined by the pressure in the particular separation zone and the ratio of vapor and liquid being removed from the particular separation zone. In such a system the conventional control method of withdrawing more liquid as the liquid level rises is unsatisfactory and in some cases inoperative. Such a control system results in a change in the equilibrium temperature and an increase in the percentage of the feed condensed due to the increased withdrawal rate of liquid, resulting in a further increase in liquid level.

Accordingly it is an object of the invention to provide an improved control system for regulating the equilibrium temperature and liquid level in a separation zone in an autorefrigerated system for the separation of a fluid into its components.

It is an object of this invention to provide a method and apparatus for separating a gas mixture. It is another object of this invention to provide economical method and apparatus for recovering helium from a gas mixture containing helium. It is a further object of the invention to provide improved method and apparatus for the recovery of various constituents from natural gas, such as natural gas liquids, helium, and nitrogen. It is a further object of this invention to provide method and apparatus for the separation of various constituents of natural gas without requiring external refrigeration. Yet another object of the invention is to provide an improved control system for utilization in the recovery of one or more components from natural gas. A still further object of the invention is to provide a new control system for the recovery of helium from natural gas. Another object of the invention is to provide method and apparatus for controlling a process for separating a gas mixture.

Other aspects, objects and advantages of the invention will be apparent from a study of the disclosure, the drawing and the appended claims to the invention.

In accordance with the present invention it has been discovered that the equilibrium temperature of a phase separation zone can be maintained substantially constant and the liquid level therein can be controlled by withdrawing the vapor stream and the liquid stream at substantially constant rates of flow while varying the pressure to which the liquid is expanded before it is passed in heat exchanging relationship with the feed stream responsive to the liquid level in the separation zone.

Also, in accordance with the invention it has been discovered that the control of the equilibrium conditions can be further enhanced by varying the rate of withdrawal of the liquid stream and/or the vapor stream responsive to the temperature in the separation zone. Still further in accordance with the invention it has been discovered that if it is desired to maintain the concentration of a particular component in either the vapor stream or the liquid stream, this can be accomplished effectively by varying the rate of withdrawal of the vapor stream and/or the liquid stream responsive to an analysis of the stream in which the concentration of said component is to be maintained constant.

Referring now to the drawing there is shown a schematic representation of a helium recovery system utilizing the present invention. A feed gas comprising helium, nitrogen, and $C_1$ to $C_5$ hydrocarbons is passed through line 11 into and through flow path 12 of heat exchanger 13 wherein the feed gas is substantially cooled to condense a portion thereof. The thus cooled fluid is passed through line 14 into phase separator 15. The liquid, which is predominately $C_1$ to $C_5$ hydrocarbons with a small amount of nitrogen, is withdrawn from phase separator 15 and passed by way of line 16 and throttling valve 17 into and through flow path 18 of heat exchanger 13 in indirect heat exchanging relationship with flow path 12 to recover refrigeration power from the liquid. For most efficient recovery of the refrigeration power, it is desirable that the liquid from line 16 be substantially completely vaporized as it is passed through heat exchanger 13. The vaporized effluent is recovered from flow path 18 and is withdrawn from the system by way of line 19 to a point of utilization as a rich gas.

The vapors, which comprise substantially all of the helium and the major portion of the nitrogen contained in the feed gas stream with the remainder being primarily methane with a small amount of $C_2$ to $C_5$ hydrocarbons, are withdrawn from phase separator 15 and passed by way of line 21 into and through flow path 22 of heat exchanger 23 wherein the vapors are substantially cooled to condense a portion thereof. The thus cooled fluid is passed by way of line 24 into phase separator 25. The condensed liquid, which is primarily methane together with substantially all of the $C_2$ to $C_5$ hydrocarbons passing through line 24 along with a minor portion of the nitrogen, is withdrawn from phase separator 25 by way of line 26 and throttling valve 27 and passed into line 28 wherein it is admixed with fluid from line 29, which is obtained as hereinafter described.

The resulting admixture is passed into and through flow path 31 of heat exchanger 23, line 32 and flow path 33 of heat exchanger 13 to recover the cooling power contained in the admixture. The vaporized effluent from flow path 33 is withdrawn from the system by way of line 34 and can be utilized as a residue gas.

The vapors, which comprise primarily helium, nitrogen and methane, are withdrawn from phase separator 25 and passed by way of line 35 into and through flow path 36 of heat exchanger 37 and line 38 into and through flow path 39 of heat exchanger 41 wherein the vapors are further cooled. The thus cooled vapors are passed by way of line 42 and valve 43 into phase separator 44. Valve 43 can be manipulated by flow rate controller 45 responsive to the differential pressure across orifice 46 located in line 35 to maintain the rate of flow through line 42 substantially constant. Liquid is withdrawn from phase separator 44 and is passed by way of line 47 into and through flow path 48 of heat exchanger 41 wherein the liquid is heated, and then through line 49 into phase separator 51. Liquid is withdrawn from phase separator 51 by way of line 52 and valve 53 and is passed into and through flow path 54 of heat exchanger 37 and then through line 29 into line 28 wherein it is admixed with the liquid withdrawn from phase separator 25.

Valve 55, which is located in line 29, is manipulated by pressure recorder controller 56 responsive to a comparison of the pressure in line 29 upstream of valve 55 as indicated by pressure transmitter 57 and a signal representative of a function of the liquid level in phase separator 51 as produced by liquid level controller 58. The manipulation of valve 55 controls the pressure downstream of valve 53 and thus the pressure to which the liquid from phase separator 51 is flashed prior to being passed through flow path 54 of heat exchanger 37. A change in the pressure to which the liquid is flashed alters the amount of cooling obtained from the expanding liquid which in turn alters the temperature to which the fluid in flow path 36 of heat exchanger 37 is cooled, and thus directly affects the amount of liquid which is condensed from the fluid in line 35. Thus for a rise in liquid level in phase separator 51 above a predetermined value, valve 55 is manipulated to increase the pressure to which the liquid in line 52 is expanded, thus decreasing the amount of heat transferred from the fluid in flow path 36 to the fluid in flow path 54, resulting in a decrease in the amount of the fluid in line 35 which is condensed before introduction into phase separator 44, and finally resulting in a decrease in the liquid level in phase separator 51. The rate of flow of fluid through line 52 can be maintained substantially constant by means of flow recorder controller 61 which manipulates valve 53 responsive to the differential pressure across orifice 62 located in line 29. When it is desired to maintain the temperature in phase separator 51 substantially constant, temperature recorder controller 63 can be utilized to automatically vary the set point input of flow recorder controller 61 responsive to the temperature in phase separator 51.

The vapors from phase separators 44 and 51 are withdrawn therefrom by way of lines 64 and 65, respectively, and are admixed in line 66. The resulting admixture is passed into and through flow path 67 of heat exchanger 68 wherein the admixture is substantially cooled to condense a portion thereof. The cooled admixture is passed by way of line 69 into phase separator 71. The rate of flow of vapors through line 66 is controlled by valve 72 which is manipulated by pressure recorder controller 73 responsive to the pressure in line 66 downstream of valve 72, as indicated by pressure transmitter 74, to maintain the pressure of the fluid downstream of valve 72 substantially constant.

The liquid, which is essentially nitrogen and methane with a small amount of helium is withdrawn from phase separator 71 and passed in series through line 75, flow path 76 of heat exchanger 68, line 77, flow path 78 of heat exchanger 37, line 79, flow path 81 of heat exchanger 23, line 82 and flow path 83 of heat exchanger 13 to recover the cooling power of the liquid. The vaporized effluent from flow path 83 is withdrawn from the system by way of line 84, and can be passed to storage or a point of utilization as a low B.t.u. fuel gas.

Valve 85, which is located in line 77, is manipulated by pressure recorder controller 86 responsive to a comparison of the pressure in line 77 upstream of valve 85 as indicated by pressure transmitter 87, and a signal representative of a function of the liquid level in phase separator 71 as produced by liquid level controller 88. The manipulation of valve 85 controls the pressure downstream of valve 89, which is located in line 75, and thus the pressure to which the liquid from phase separator 71 is flashed prior to being passed through flow path 76 of heat exchanger 68. A change in the pressure to which the liquid is flashed alters the amount of cooling obtained from the expanding liquid which in turn alters the temperature to which the fluid in flow path 67 of heat exchanger 68 is cooled, and thus directly affects the amount of liquid which is condensed from the fluid in line 66. Thus for a decrease in liquid level in phase separator 71 below a predetermined value, valve 85 is manipulated to decrease the pressure to which the liquid in line 75 is expanded, thus increasing the amount of heat transferred from the fluid in flow path 67 to the fluid in flow path 76, resulting in an increase in the amount of the fluid in line 66 which is condensed before introduction into phase separator 71, and finally resulting in an increase in the liquid level in phase separator 71. The rate of flow of fluid through line 75 can be maintained substantially constant by means of flow recorder controller 91 which manipulates valve 89 responsive to the differential pressure across orifice 90 located in line 84.

The vapors, which are essentially helium and nitrogen, are withdrawn from phase separator 71 by way of line 92 and are passed in series through flow path 93 of heat exchanger 68, line 94, flow path 95 of heat exchanger 37, line 96, flow path 97 of heat exchanger 23, line 98 and flow path 99 of heat exchanger 13 to recover the cooling power of the vapors. The effluent from flow path 99 is withdrawn from the system as a helium concentrate stream by way of line 101 and can be passed to a point of storage, utilization or further processing. The rate of flow of vapors through line 92 can be controlled by valve 102, which is located in line 92, which is manipulated by flow rate recorder controller 103 responsive to the differential pressure across orifice 104 located in line 94. The pressure in line 94 is maintained substantially constant by valve 105 which is manipulated by pressure recorder controller 106 responsive to the pressure of the vapors in line 94 upstream of valve 105 as indicated by pressure transmitter 107.

Flow controllers 91 and 103 can be set to maintain substantially constant the ratio of the rate of withdrawal of vapors from separator 71 to the rate of withdrawal of liquid from separator 71. When it is desired to maintain the concentration of a specific component in either the vapor or the liquid withdrawn from separator 71 substantially constant or within a predetermined range, the ratio of the rates of withdrawal can be varied, responsive to the variation in the concentration of the specific component. Thus when it is desired to maintain the concentration of helium in the liquid withdrawn from separator 71 substantially constant or below a predetermined value, a sample of the liquid can be withdrawn from line 75 and introduced to analyzer 108. Analyzer 108 produces a signal representative of the concentration of helium in the sample, and the signal can be transmitted to flow recorder controller 91 to adjust the set point input thereto. If desired a ratio controller can be utilized to adjust the set points of flow controllers 91 and 103, with the set point of the ratio controller being varied according to the output of analyzer 108. Thus far an increase in the concentration of helium in the liquid in line 75, analyzer 108 would cause flow controller 91 to reduce the rate of flow of liquid through line 75 while for a decrease in the concentration of helium in the liquid in line 75, flow controller 91 would be adjusted by analyzer 108 to increase the rate of flow of liquid through line 75. While the control system has been illustrated with both the analyzer and corresponding flow controller on the liquid withdrawal line, it is within the contemplation of the invention to vary the rate of withdrawal of vapors from separator 71 responsive to the concentration of helium in either line 75 or line 92.

When it is not necessary to maintain accurate control of the separations in phase separators 15 and 25, conventional control systems, such as controlling rate of liquid withdrawal responsive to liquid level, can be utilized. However, where accurate control is desirable or necessary, it is preferred to utilize for separators 15 and 25 a control system in accordance with the invention as illustrated with separators 51 and 71.

The following specific example is presented in further illustration of the invention but is not to be construed to unduly limit the invention.

EXAMPLE

A system in accordance with the drawing for the recovery of helium from natural gas is operated under the conditions and with the results set forth in the following table.

| Stream | Composition | | | | | | | Pressure, p.s.i.g. | Temperature, °F. | Flow Rate, lbs./hr. |
|---|---|---|---|---|---|---|---|---|---|---|
| | He | N$_2$ | C$_1$ | C$_2$ | C$_3$ | C$_4$ | C$_5$ | | | |
| 11 | 0.75 | 14.84 | 71.72 | 6.19 | 4.09 | 1.68 | 0.73 | 350 | 90 | 501,626 |
| 14 | 0.75 | 14.84 | 71.72 | 6.19 | 4.09 | 1.68 | 0.73 | 350 | −80 | 501,626 |
| 16 | | 1.40 | 26.52 | 21.24 | 30.37 | 14.07 | 6.40 | 350 | −80 | 50,305 |
| 19 | | 1.40 | 26.52 | 21.24 | 30.37 | 14.07 | 6.40 | 20 | 81 | 50,305 |
| 21 | 0.84 | 16.54 | 77.43 | 4.29 | 0.77 | 0.11 | 0.02 | 350 | −80 | 200,508 |
| 24 | 0.84 | 16.54 | 77.43 | 4.29 | 0.77 | 0.11 | 0.02 | 350 | −165 | 200,508 |
| 26 | 0.02 | 5.46 | 82.52 | 9.87 | 1.83 | 0.07 | 0.03 | 350 | −165 | 83,621 |
| 28 | 0.01 | 10.98 | 83.09 | 4.90 | 0.88 | 0.13 | 0.01 | 225 | −177 | 171,374 |
| 29 | 0.01 | 16.04 | 83.60 | 0.35 | | | | 225 | −175 | 87,753 |
| 32 | 0.01 | 10.98 | 83.09 | 4.90 | 0.88 | 0.13 | 0.01 | 225 | −90 | 171,374 |
| 34 | 0.01 | 10.98 | 83.09 | 4.90 | 0.88 | 0.13 | 0.01 | 225 | 81 | 171,374 |
| 35 | 1.44 | 24.51 | 73.77 | 0.28 | | | | 350 | −165 | 116,887 |
| 38 | 1.44 | 24.51 | 73.77 | 0.28 | | | | 350 | −197 | 116,887 |
| 42 | 1.44 | 24.51 | 73.77 | 0.28 | | | | 350 | −200 | 116,887 |
| 47 | 0.04 | 17.37 | 82.25 | 0.34 | | | | 225 | −212 | 91,193 |
| 49 | 0.04 | 17.37 | 82.25 | 0.34 | | | | 225 | −207.5 | 91,193 |
| 52 | 0.01 | 16.04 | 83.60 | 0.35 | | | | 225 | −207.5 | 87,753 |
| 64 | 7.38 | 55.0 | 37.61 | | | | | 225 | −212 | 25,694 |
| 65 | 1.14 | 56.67 | 42.19 | | | | | 225 | −207.5 | 3,440 |
| 66 | 6.69 | 55.64 | 37.67 | | | | | 225 | −212 | 29,134 |
| 69 | 6.69 | 55.64 | 37.67 | | | | | 225 | −289 | 29,134 |
| 75 | 0.03 | 57.68 | 42.29 | | | | | 75 | −295 | 26,829 |
| 77 | 0.03 | 57.68 | 42.29 | | | | | 75 | −219 | 26,829 |
| 79 | 0.03 | 57.68 | 42.29 | | | | | 75 | −175 | 26,829 |
| 82 | 0.03 | 57.68 | 42.29 | | | | | 75 | −90 | 26,829 |
| 84 | 0.03 | 57.68 | 42.29 | | | | | 75 | 81 | 26,829 |
| 92 | 55.01 | 40.83 | 4.16 | | | | | 75 | −295 | 2,305 |
| 94 | 55.01 | 40.83 | 4.16 | | | | | 75 | −219 | 2,305 |
| 96 | 55.01 | 40.83 | 4.16 | | | | | 75 | −175 | 2,305 |
| 98 | 55.01 | 40.83 | 4.16 | | | | | 75 | −90 | 2,305 |
| 101 | 55.01 | 40.83 | 4.16 | | | | | 75 | 81 | 2,305 |

The control system of the invention provides effective control during start up procedures as well as during system upsets. While the control system of the invention has been illustrated in combination with a helium recovery system, the invention can be utilized in many low temperature fluid separation systems for the recovery of components other than helium.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not mean that such a piece of equipment is intended to be omitted simply because it does not appear in the drawing. Thus while the heat exchangers have been illustrated with one flow path for each process line, it is obvious that any suitable number of flow paths can be utilized. Suffice to say, the drawing is for illustrative purposes, as is the description thereof.

Reasonable variation and modification are possible within the scope of the foregoing disclosure, the drawing and the appended claims to the invention.

We claim:

1. Apparatus for the separation of a mixture of gases comprising an indirect heat exchanger having first and second flow paths therethrough, first conduit means for passing said mixture into and through said first flow path of said indirect heat exchanger to liquefy a portion of said mixture; a phase separator; second conduit means for passing the thus cooled and partially liquefied mixture from the outlet of said first flow path into said phase separator; third conduit means connected to the upper portion of said phase separator for withdrawing uncondensed gases from said phase separator; fourth conduit means connected between the lower portion of said phase separator and the inlet of said second flow path of said indirect heat exchanger for withdrawing liquid from said phase separator and passing the thus withdrawn liquid into and through said second flow path in indirect heat exchanging relationship with the fluid contents of said first flow path; means operatively positioned in said fourth conduit means for flashing the withdrawn liquid to produce a flashed fluid stream; fifth conduit means for withdrawing the fluid from the outlet of said second flow path of said indirect heat exchanger; a valve operatively positioned in said fifth conduit means; means operatively connected to said phase separator for sensing the liquid level therein and producing a first signal representative of the thus sensed liquid level; and means for regulating said valve as a function of said first signal by throttling said valve to increase the pressure to which said withdrawn liquid is flashed as a function of an increase in said liquid level above a predetermined value and opening said valve to decrease the pressure to which said withdrawn liquid is flashed as function of a drop in said liquid level below a predetermined value to thus maintain the liquid level in said phase separator substantially constant.

2. Apparatus for the separation of a mixture of gases comprising an indirect heat exchanger having first and second flow paths therethrough, first conduit means for passing said mixture into and through said first flow path of said indirect heat exchanger to liquefy a portion of said mixture; a phase separator; second conduit means for passing the thus cooled and partially liquefied mixture from the outlet of said first flow path into said phase separator; third conduit means connected to the upper portion of said phase separator for withdrawing uncondensed gases from said phase separator; fourth conduit means connected between the lower portion of said phase separator and the inlet of said second flow path of said indirect heat exchanger for withdrawing liquid from said phase separator and passing the thus withdrawn liquid into and through said second flow path in indirect heat exchanging relationship with the fluid contents of said first flow path; means operatively positioned in said fourth conduit means for flashing the withdrawn liquid to produce a flashed fluid stream; fifth conduit means for withdrawing the fluid from the outlet of said second flow path of said indirect heat exchanger; a valve operatively positioned in said fifth conduit means; a pressure controller having a signal input, a setpoint input and a control output; means for sensing the pressure of the flashed fluid stream at a point downstream of said means for flashing and upstream of said valve and applying a signal representative of the thus sensed pressure to said signal input of said pressure controller; means operatively connected to said phase separator for sensing the liquid level therein and applying a signal representative of the thus sensed liquid level to said setpoint input of said pressure controller; and means for regulating said valve responsive to said control output of said pressure controller by throttling said valve to increase the pressure to which said withdrawn liquid is flashed as a function of an increase in said liquid level above a predetermined value and opening said valve to decrease the pressure to which said withdrawn liquid is flashed as a function of a drop in said liquid level below a predetermined value to thus maintain the liquid level in said phase separator substantially constant.

3. Apparatus for the separation of a mixture of gases comprising an indirect heat exchanger having first and second flow paths therethrough, first conduit means for passing said mixture into and through said first flow path of said indirect heat exchanger to liquefy a portion of said mixture; a phase separator; second conduit means for passing the thus cooled and partially liquefied mixture from the outlet of said first flow path into said phase separator; third conduit means connected to the upper portion of said phase separator for withdrawing uncondensed gases from said phase separator; fourth conduit means connected between the lower portion of said phase separator and the inlet of said second flow path of said indirect heat exchanger for withdrawing liquid from said phase separator and passing the thus withdrawn liquid into and through said second flow path in indirect heat exchanging relationship with the fluid contents of said first flow path; a first valve operatively positioned in said fourth conduit means for flashing the withdrawn liquid to produce a flashed fluid stream; fifth conduit means for withdrawing the fluid from the outlet of said second flow path of said indirect heat exchanger; a second valve operatively positioned in said fifth conduit means; a pressure controller having a signal input, a setpoint input and a control output; means for sensing the pressure in said fifth conduit means upstream of said second valve and applying a signal representative of the thus sensed pressure to said signal input of said pressure controller; means operatively connected to said phase separator for sensing the liquid level therein and applying a signal representative of the thus sensed liquid level to said setpoint input of said pressure controller; and means for regulating said second valve responsive to said control output of said pressure controller by throttling said second valve to increase the pressure to which said withdrawn liquid is flashed as a function of an increase in said liquid level above a predetermined value and opening said second valve to decrease the pressure to which said withdrawn liquid is flashed as a function of a drop in said liquid level below a predetermined value to maintain the liquid level in said phase separator substantially constant.

4. Apparatus in accordance with claim 3 further comprising means operatively connected to said first valve for controlling the rate of withdrawal of liquid from said phase separator at a substantially constant value.

5. Apparatus in accordance with claim 3 further comprising means operatively connected to said first valve for controlling the rate of withdrawal of liquid from said phase separator as a function of the temperature in said phase separator.

6. Apparatus in accordance with claim 3 further comprising means operatively connected to said first valve for controlling the rate of withdrawal of liquid from said phase separator as a function of the concentration in said liquid of a component in said liquid.

7. Apparatus in accordance with claim 3 further comprising means operatively connected to said first valve and to said third conduit means for controlling the ratio of the rate of withdrawal of uncondensed gases from said phase separator to the rate of withdrawal of liquid from said phase separator.

8. A process for the separation of a mixture of gases comprising passing the mixture through an indirect heat exchanging zone to liquefy a portion of said mixture, introducing the thus cooled mixture into a separation zone, withdrawing uncondensed gases from said separation zone, withdrawing liquid from said separation zone, flashing the thus withdrawn liquid, passing the flashed fluid thus obtained through said heat exchanging zone in indirect heat exchanging relationship with said mixture, and controlling at a point downstream of said indirect heat exchanging zone the pressure to which said withdrawn liquid is flashed as a function of the liquid level in said separation zone by increasing the pressure to which said withdrawn liquid is flashed as a function of an increase in said liquid level above a predetermined value and decreasing the pressure to which said withdrawn liquid is flashed as a function of a drop in said liquid level below a predetermined value to maintain said liquid level substantially constant.

9. A process in accordance with claim 8 further comprising controlling the rate of withdrawal of liquid from said separation zone at a substantially constant rate.

10. A process in accordance with claim 8 further comprising controlling the rate of withdrawal of liquid from said separation zone as a function of the temperature in said separation zone.

11. A process in accordance with claim 8 further comprising controlling the rate of withdrawal of liquid from said separation zone as a function of the concentration in said liquid of a component of said mixture.

12. A process for the separation of a mixture of gases comprising passing the mixture through an indirect heat exchanging zone to liquefy a portion of said mixture, introducing the thus cooled mixture into a separation zone, withdrawing uncondensed gases from said separation zone, passing the thus withdrawn uncondensed gases through said indirect heat exchanging zone in indirect heat exchanging relationship with said mixture, withdrawing liquid from said separation zone, flashing the thus withdrawn liquid, passing the flashed fluid thus obtained through said indirect heat exchanging zone in indirect heat exchanging relationship with said mixture, controlling at a point downstream of said indirect heat exchange zone the pressure to which said withdrawn liquid is flashed as a function of the liquid level in said separation zone by increasing the pressure to which said withdrawn liquid is flashed as a function of an increase in said liquid level above a predetermined value and decreasing the pressure to which said withdrawn liquid is flashed as a function of a drop in said liquid level below a predetermined value to maintain said liquid level substantially constant, and maintaining the ratio of the rate of withdrawal of uncondensed gases from said separation zone to the rate of withdrawal of liquid from said separation zone substantially constant.

13. A process for the separation of a mixture of gases comprising passing the mixture through an indirect heat exchanging zone to liquefy a portion of said mixture, introducing the thus cooled mixture into a separation zone, withdrawing uncondensed gases from said separation zone, passing the thus withdrawn uncondensed gases through said indirect heat exchanging zone in indirect heat exchanging relationship with said mixture, withdrawing liquid from said separation zone, flashing the thus withdrawn liquid, passing the flashed fluid thus obtained through said indirect heat exchanging zone in indirect heat exchanging relationship with said mixture, controlling at a point downstream of said indirect heat exchanging zone the pressure to which said withdrawn liquid is flashed as a function of the liquid level in said separation zone by increasing the pressure to which said withdrawn liquid is flashed as a function of an increase in said liquid level above a predetermined value and decreasing the pressure to which said withdrawn liquid is flashed as a function of a drop in said liquid level below a predetermined value to maintain said liquid level substantially constant, and controlling the rate of withdrawal of liquid from said separation zone as a function of the temperature in said separation zone.

14. A process for the separation of a mixture of gases comprising passing the mixture through an indirect heat exchanging zone to liquefy a portion of said mixture, introducing the thus cooled mixture into a separation zone, withdrawing uncondensed gases from said separation zone, passing the thus withdrawn uncondensed gases through said indirect heat exchanging zone in indirect heat exchanging relationship with said mixture, withdrawing liquid from said separation zone, flashing the thus withdrawn liquid, passing the flashed fluid thus obtained through said indirect heat exchanging zone in indirect heat exchanging relationship with said mixture, controlling at a point downstream of said indirect heat exchanging zone the pressure to which said withdrawn liquid is flashed as a function of the liquid level in said separation zone by increasing the pressure to which said withdrawn liquid is flashed as a function of an increase in said liquid level above a predetermined value and decreasing the pressure to which said withdrawn liquid is flashed as a function of a drop in said liquid level below a predetermined value to maintain said liquid level substantially constant, and controlling the ratio of the rate of withdrawal of uncondensed gases from said separation zone to the rate of withdrawal of liquid from said separation zone as a function of the concentration in said liquid of a component of said mixture.

15. A process in acordance with claim 14 wherein said mixture of gases comprises natural gas and said component is helium.

References Cited by the Examiner
UNITED STATES PATENTS

| | | | |
|---|---|---|---|
| 1,876,551 | 9/1932 | Barstow | 62—23 |
| 2,475,957 | 7/1949 | Gilmore | 62—37 XR |
| 2,603,310 | 7/1952 | Gilmore | 62—37 XR |
| 2,756,765 | 7/1956 | Agule | 62—218 XR |
| 2,882,693 | 4/1959 | Clay | 62—37 XR |
| 2,939,293 | 6/1960 | Green | 62—28 XR |
| 2,976,234 | 3/1961 | Webber | 202—160 XR |
| 3,148,966 | 9/1964 | Kitchen | 62—37 XR |
| 3,160,489 | 12/1964 | Brocoff | 62—21 |

NORMAN YUDKOFF, *Primary Examiner.*